Jan. 20, 1959     B. A. QUINN     2,869,219
METHOD OF MAKING HINGES HAVING LOCKED-IN BUSHINGS
Filed May 2, 1955
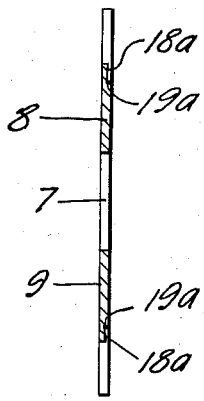
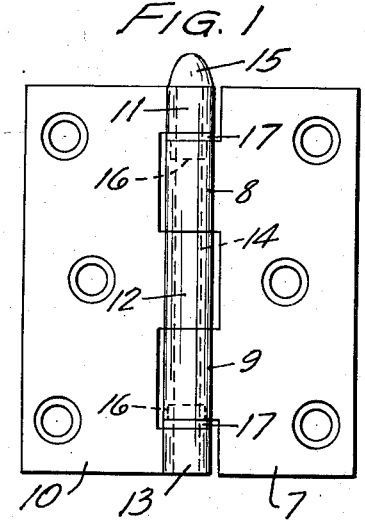
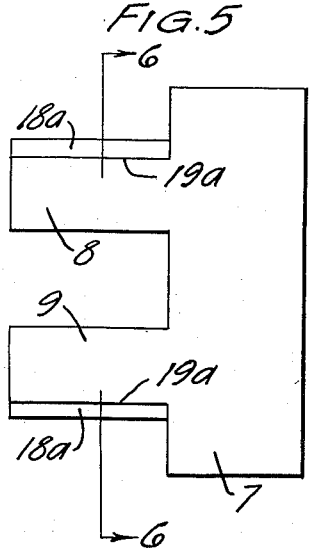
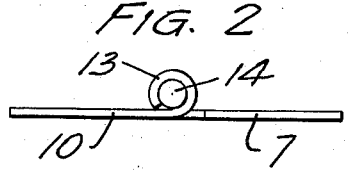
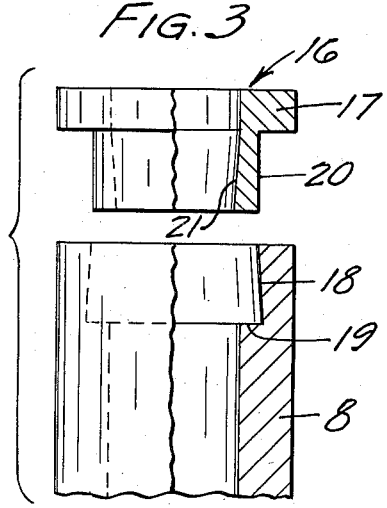
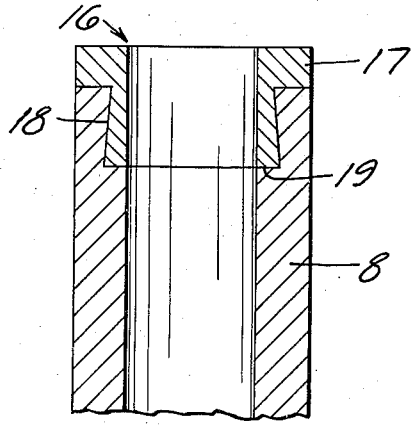
INVENTOR.
BERT A. QUINN
BY
ATTORNEY United States Patent Office 2,869,219
Patented Jan. 20, 1959

2,869,219

METHOD OF MAKING HINGES HAVING LOCKED-IN BUSHINGS

Bert A. Quinn, St. Paul, Minn., assignor to Ideal Brass Works, Inc., St. Paul, Minn., a corporation of Minnesota Application May 2, 1955, Serial No. 505,165

3 Claims. (Cl. 29—149.5)

This invention relates to hinges having bushings between the hinge pins and knuckle members and particularly to improved hinge pin bearings and a method of making them.

It is an object of my invention to provide a hinge of high quality and relatively low cost wherein the principal bearing members comprise bushings which are securely held in place in the knuckle members.

A further object is to provide a novel low-cost method of making such high grade hinges whereby the knuckle members and bushings are permanently interlocked to insure against separation of the bushings from the other hinge members.

Other objects will appear and be more fully pointed out in the following specification and claims.

The invention will be best understood by reference to the accompanying drawing which illustrates, by way of example and not for the purpose of limitation, a preferred embodiment of my invention.

In the drawing:

Figure 1 is a front elevational view showing one of my improved hinges;

Fig. 2 is an end view of the same;

Fig. 3 is an enlarged, fragmentary, part elevational and part vertical sectional view showing one of my improved bushing members, together with the portion of one of the knuckle members which is to receive the bushings, the parts being shown separated;

Fig. 4 is a fragmentary vertical sectional assembly view of one of the bushings in place in the knuckle member;

Fig. 5 is a plan view of one of the blank hinge plates or leaves with its flat, integral knuckle members, and Fig. 6 is a section taken on the line 6—6 of Fig. 5.

As shown in Figs. 1 and 2, the hinge may comprise a leaf 7 formed with knuckle members 8 and 9, a co-acting leaf 10 formed with knuckle members 11, 12, and 13 and a hinge pin 14 fitting in the several knuckle members and connecting the leaf 7 to the leaf 10. The hinge pin 14 is of the removable type having a head 15 formed or fixed on its normally upper end. Interposed between each of the knuckle members 8 and 9 and the hinge pin 14 are similar bushings indicated generally by the numeral 16. Each of these bushings is preferably formed with an annular flange 17 constituting an end thrust bearing member between adjoining knuckle members.

Each of the knuckle members 8 and 9 is formed with an undercut recess defined by a substantially conical internal surface 18 and an annular shoulder 19. This recess contains one of the bushings 16. As shown in Fig. 3, the bushing 16, before it is inserted in the knuckle recess, has a substantially cylindrical outer surface 20 of such diameter as to pass readily into the recess 18. The bushing, before insertion, is also formed with a substantially conical internal surface 21 of diameter in the plane of the lower end of the bushing slightly smaller than the internal diameter of the knuckle member 8. After insertion in the knuckle recess the bushing 16 is expanded, as indicated in Fig. 4, so that the surface 20 fits the inner conical surface 18 of the knuckle member and the internal diameter of the bushing becomes substantially cylindrical to fit the hinge pin 14. Another bushing 16 is similarly secured in the undercut recess 18 formed in the knuckle member 9. It will thus be evident that the bushings 16 are securely held in the knuckle members 8 and 9 in the finished hinge, irrespective of whether the pin 14 is in place or whether the leaves of the hinge are separated.

Important economies in the manufacture of the hinge are obtained by the method of making it hereinafter described. The recesses defined by the surfaces 18 and 19 are formed on the knuckle members 8 and 9 while the latter members are flat, as an integral part of a blank leaf 7, as indicated in Fig. 5. Plane surfaces corresponding to the curved surfaces 18 and 19 are indicated at 18a and 19a respectively in Figs. 5 and 6. These plane surfaces may be formed by the use of a suitable die in a high pressure press or by a milling operation before the knuckle members 8 and 9 are bent or rolled to form the hollow, substantially cylindrical pin-embracing knuckles. The angle of the surface 18a relative to the main plane of the blank corresponds with the taper angle of the surface 18 relative to the axis of the cylindrical knuckle 8. Such undercutting of the recess for the bushing may be on the order of a few thousandths of an inch or less than .010 inch.

After the formation of the surfaces 18a and 19a on the flat blank, the knuckle members 8 and 9 are bent to give them their hollow cylindrical form. The leaf 7 may be perforated for screws or other fastening members in the usual manner, either before or after the formation of the surfaces 18a and 19a. As the next step, a bushing 16, shaped as shown in Fig. 3, having an outer diameter of its surface 20 slightly smaller than the smallest diameter of the knuckle surface 18, is inserted in the undercut recesses. The bushing in finally expanded by forcing a suitable mandrel or hardened steel pin of the proper diameter through the opening in the bushing to engage and expand the conical surface 21 forcibly. This causes the outer surface of the bushing to fit the undercut recess defined by the surfaces 18 and 19 and to reform the bushing to fit the hinge pin. As indicated, it is usually desirable to provide at least two of the bushings for each hinge.

The bushings are preferably constructed from porous bearing material impregnated with a lubricant such as oil cushion material or "Oilite" bronze bearing material. The resulting hinge is characterized by its high quality, durablity and freedom from the usual difficulties attendant upon retaining the bushings in place during handling, assembly and installation of the hinges. Their cost is substantially reduced by my improved method as compared with conventional methods of constructing hinges of like quality.

I claim:

1. The method of making a hinge plate having a substantially cylindrical hinge pin bearing which comprises, forming on a flat sheet metal blank having a flat integral knuckle member, a longitudinally extending shoulder and an adjoining plane surface defining a recess extending along a margin of said knuckle member, said recess having greater depth along said shoulder than along its outer longitudinal side; bending the flat knuckle member to form a hollow, substantially cylindrical knuckle and a knuckle recess the diameter of which is larger adjacent to said shoulder than at the outer side of said recess; inserting in telescoping relation to said knuckle recess a pre-formed annular bushing having a substantially conical interior surface tapering to an inner diameter smaller than the inner diameter of said cylindrical knuckle, said bushing having a substantially cylindrical outer surface for contact with the surface of said knuckle recess; and forcibly expanding said bushing to form a substantially cylindrical interior surface and a substantially conical exterior surface thereon interlocking with said knuckle recess.

2. The method of making a hinge of the type having a sheet metal plate fitted with substantially cylindrical bushings and a removable pin fitting in said bushings which comprises, forming from flat sheet metal blank a hinge plate having a plurality of flat integral knuckle members, forming on each of at least a pair of said flat knuckle members a longitudinally extending shoulder and an adjoining plane surface defining a recess extending along a margin of said knuckle member, said recess having greater depth along said shoulder than along its outer longitudinal side; bending the flat knuckle members to form a plurality of hollow, substantially cylindrical knuckles and knuckle recesses the interior diameters of which are larger adjacent to the respective shoulders than at the outer side of said recess; inserting in telescoping relation to each of said knuckle recesses a preformed annular bushing having a substantially conical interior surface tapering to an inner diameter smaller than the inner diameter of said cylindrical knuckles, each of said bushings having a substantially cylindrical outer surface for contact with the conical surface of said knuckle recess; forcibly expanding each of said bushings to form substantially cylindrical interior surfaces thereon and substantially conical exterior surfaces thereon interlocking with the knuckle recesses of the respective knuckles; assembling the hinge plate so formed with a coacting hinge plate; and connecting said hinge plates together by inserting in said bushings and knuckles of the respective hinge plates a hinge pin having a substantially smooth cylindrical surface slidably fitting in said bushings.

3. A method of making a hinge in accordance with claim 2 in which each of said bushings is formed with an annular flange fitting between and constituting an end thrust bearing between knuckle members of the respective hinge plates.

References Cited in the file of this patent

UNITED STATES PATENTS

| | | |
|---|---|---|
| 1,484,610 | Myers | Feb. 19, 1924 |
| 1,580,257 | Kimball | Apr. 13, 1926 |
| 2,036,551 | Stevens | Apr. 7, 1936 |
| 2,057,942 | Fay | Oct. 20, 1936 |
| 2,185,483 | Ward | Jan. 2, 1940 |
| 2,446,515 | Weingart | Aug. 3, 1948 |
| 2,481,025 | Koch | Sept. 6, 1949 |
| 2,756,484 | Booth | July 31, 1956 |

FOREIGN PATENTS

| | | |
|---|---|---|
| 24,411 | Switzerland | June 18, 1901 |